Patented July 10, 1934

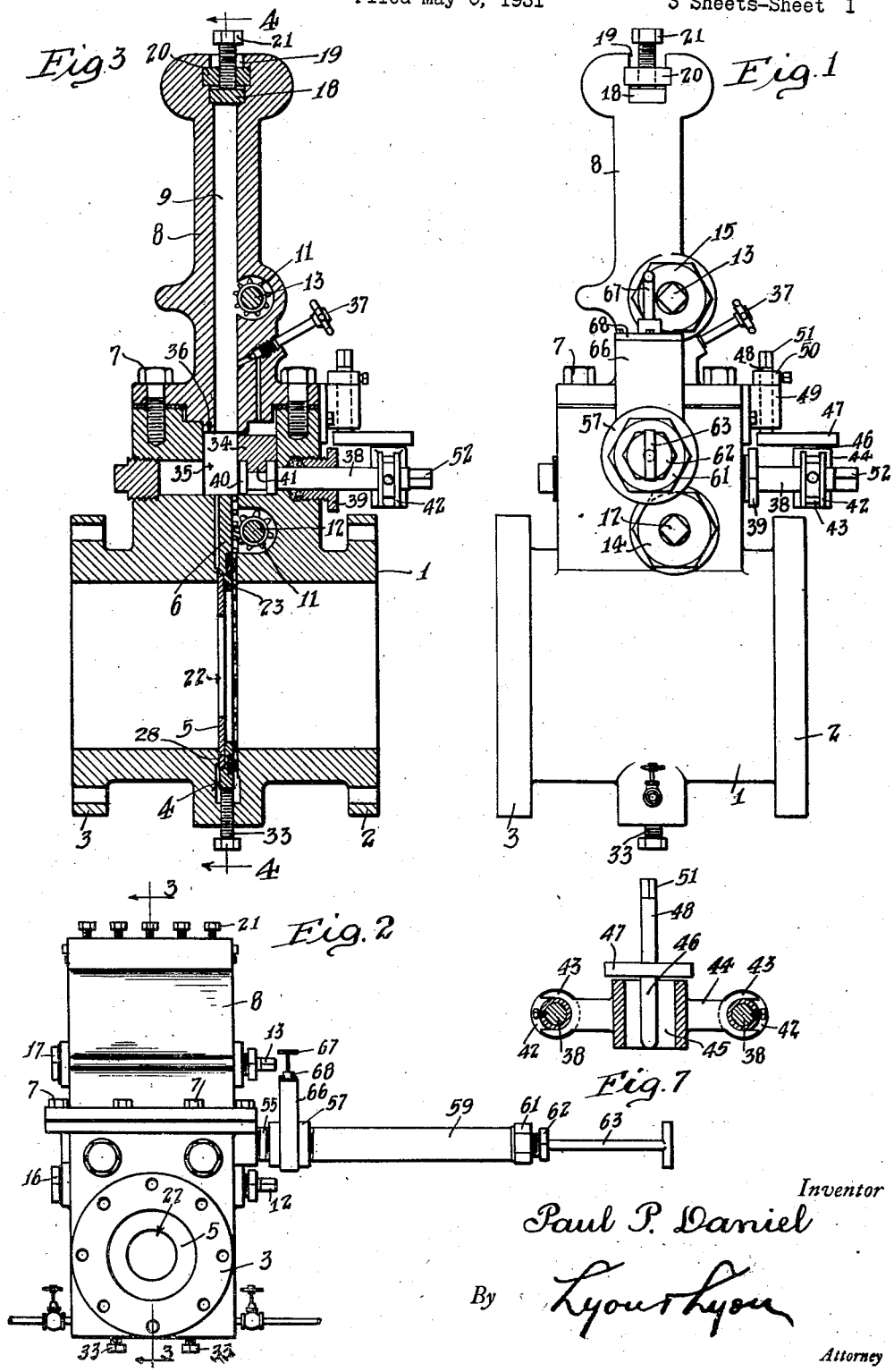

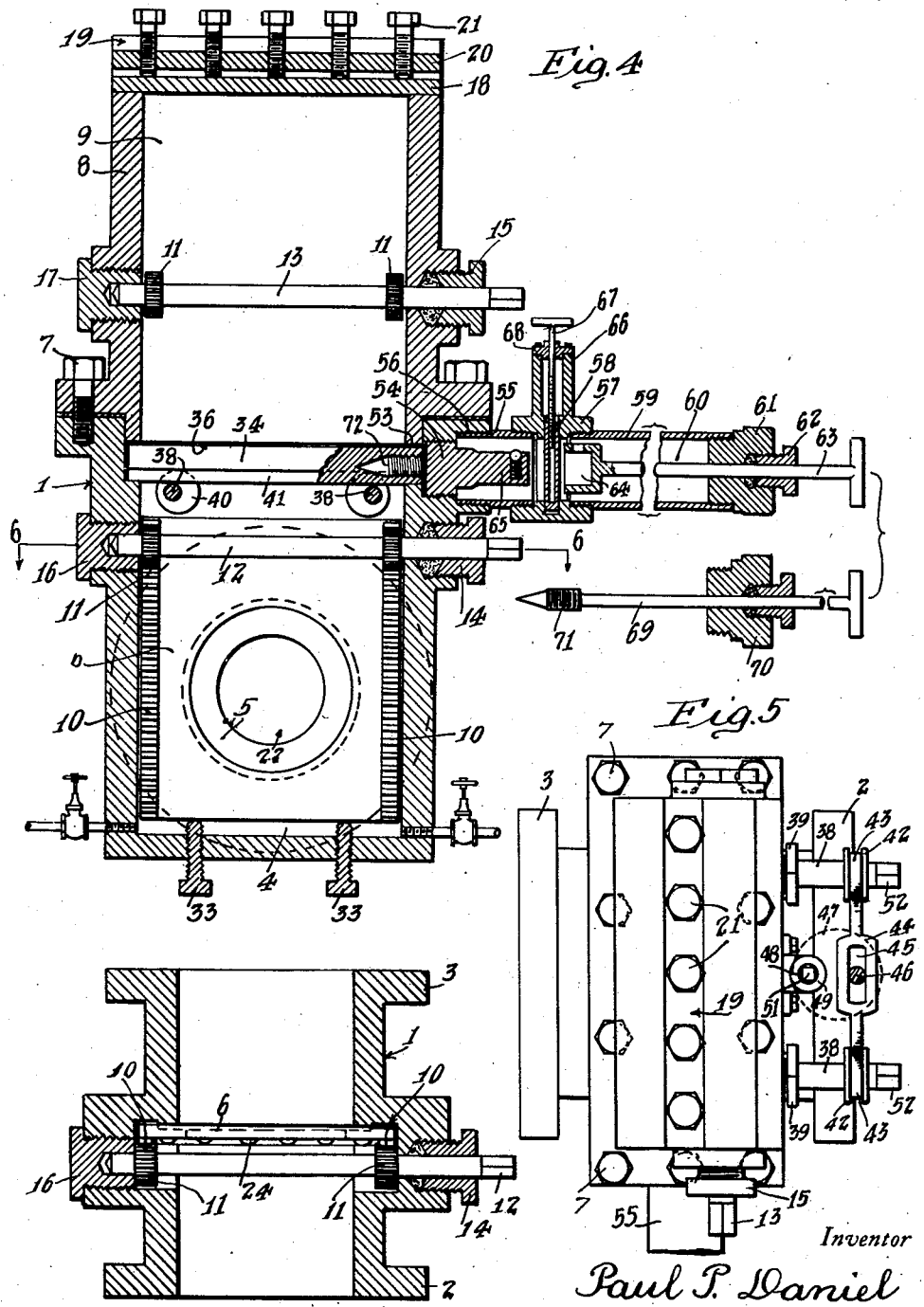

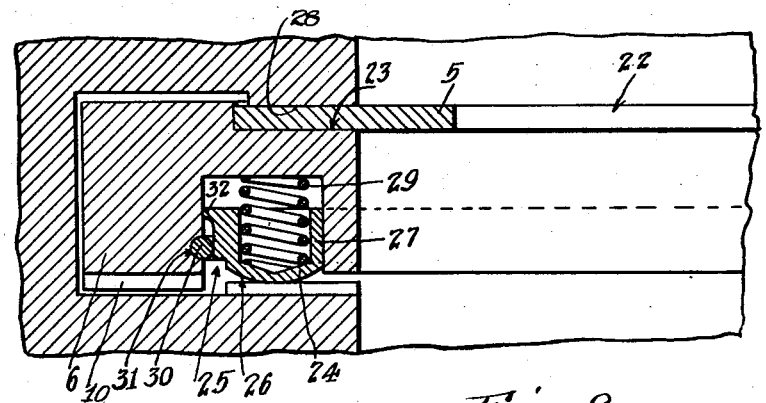
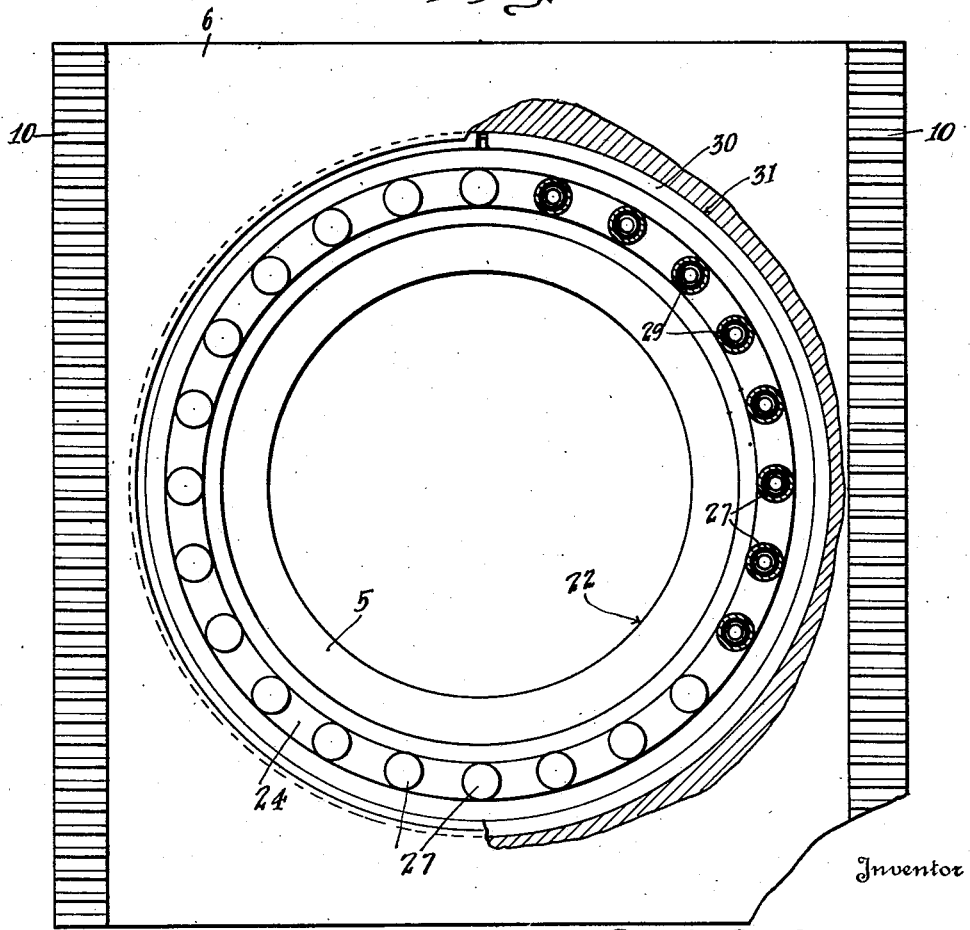

1,965,826

UNITED STATES PATENT OFFICE 1,965,826

ORIFICE METER PLATE HOUSING

Paul P. Daniel, Los Angeles, Calif.

Application May 6, 1931, Serial No. 535,389

11 Claims. (Cl. 137—75)

This invention relates to orifice meter plate housings, and is more particularly related to an orifice plate holder adapted for use in high or low pressure pipe lines for removably supporting in position an orifice plate in a manner to enable the removal, change or repair of the orifice plate without interrupting the flow through the pipe line.

An object of this invention is to provide an orifice meter plate housing for removably supporting an orifice plate in a pipe line which includes means for withdrawing the orifice plate from position in the pipe line into a plate removing chamber, and means for closing the plate removing chamber after the orifice plate has been moved into the chamber, which means includes a closure plate and means for moving the closure plate transversely of the path of movement of the orifice plate to close the plate removing chamber so that the orifice plate may be removed, repaired or changed as desired.

Another object of this invention is to provide an orifice plate housing which includes an orifice plate housing adapted to be positioned in a pipe line, an orifice plate removing chamber positioned above the first orifice chamber and into which the orifice plate is adapted to be moved, and means laterally and vertically shiftable to close the removal chamber when the orifice plate is positioned therein, and means permitting the removal of the closure means for repairing or replacing the same as desired.

Another object of this invention is to provide a means for sealing the orifice meter plate in the housing after it is positioned in the pipe line, which means includes a ring expansible to lock and seal the orifice plate in position.

Other objects and advantages of this invention it is believed will be apparent from the following detailed description of a preferred embodiment thereof as illustrated in the accompanying drawings.

Figure 1 is a side elevation of an orifice meter plate housing embodying my invention.

Figure 2 is an end elevation thereof.

Figure 3 is a sectional side elevation thereof, taken substantially on the line 3—3 of Fig. 2.

Figure 4 is an enlarged sectional end view taken substantially on the line 4—4 of Figure 3.

Figure 5 is a plan view thereof with the valve removal means broken away.

Figure 6 is a sectional plan view taken substantially on the line 6—6 of Figure 4.

Figure 7 is a fragmental view of a portion of the valve actuating means.

Figure 8 is an enlarged fragmental section of the orifice plate sealing means embodied in my invention.

Figure 9 is an enlarged front elevation partially broken away of the orifice plate carrier.

In the preferred embodiment of my invention illustrated in the accompanying drawings, 1 indicates an orifice plate housing which is adapted to be position in a pipe line and to be secured in position therein by any suitable means such, for example, as by the flanges 2 and 3. The housing 1 is formed to provide an orifice plate chamber 4 into which an orifice plate 5 mounted in a carrier 6 is adapted to be positioned.

Secured to housing 1 in fluid tight relation by means of cap bolts 7 is an orifice plate removing housing 8 which provides the plate removing chamber 9 into which the carrier 6 is moved when it is desired to change, replace or repair the plate 5.

In order to move the carrier 6 from the plate chamber 4 to the plate removing chamber 9, I prefer to provide the carrier 6 with spaced gear racks 10 which are engaged with gears 11 mounted on spaced shafts 12 and 13. The shafts 12 and 13 are journaled in the housing 1 and 8 respectively and project from their housing through stuffing boxes 14 and 15. The opposite ends of the shafts 12 and 13 are journaled in plugs 16 and 17 threaded into the housing 1 and 8 in enlarged openings, permitting removal of the shafts 12 and 13 and their assembled gears 11 when required for repair.

The upper end of the housing 8 is formed to removably receive a sealing block 18 and is slotted at 19 to receive the locking bar 20. The sealing block 18 closes the upper end of the plate removing chamber 9 and is held in position by means of a series of cap screws 21 threaded through the locking bar 20 to engage and force the sealing bar 18 upon its seat at the upper end of the housing 8.

The orifice plate 5 having a metering orifice 22, is mounted in the carrier 6 within a recess 23 formed in one face of the carrier 6. An expansibly mounted sealing ring 24 is mounted in an annular groove 25 formed in the other face of the carrier 6. The ring 24 is formed with a plurality of spaced cylindrical spring housing and guide projections 27 on its inner face which fit into groove 25. Springs 29 are mounted in the projections 27 and act to normally expand the ring 24 outward from the carrier 6 to force the carrier 6 into position to clamp and seal the orifice plate 5 in position within the chamber 4. A stop ring 30 is mounted in an annular recess 31 in position to engage a stop flange 32 of the ring 24 to hold the ring 24 from being displaced out of the groove 25. The orifice plate 5 is seated by the expansible ring 24 on the annular seat 28 which extends into the chamber 4. Adjustable positioning stops 33 are provided by bolts threaded through the lower portion of the housing 1 to engage the carrier 6.

The chambers 4 and 9 are normally in open communication but means are provided for closing the chamber 4 to prevent flow into the chamber 9 when the carriage 6 is moved into the chamber 9 so as to permit removal of the sealing block 18 to gain access to the carriage 6 and plate 5, which means are, in their preferred form, constructed to include a valve block 34 which is mounted within a valve block chamber 35 formed in the housing 1.

The chamber 35 is formed to permit the movement of the block 34 laterally out of the path of movement of the carriage 6. The lower end of the housing 8 is formed to extend into the chamber 35 and provide a seat 36 against which the block 34 is seated.

Means are provided in the balancing valve 37 for maintaining equal pressure within the chambers 35 and 9 during the movement of the carrier 6.

During the removal of the orifice plate from chamber 9, this chamber is at atmospheric pressure, the valve 34 sealing chamber 9 from chamber 4. When the orifice plate has been changed and chamber 9 again sealed, the balancing valve may be actuated to admit sufficient pressure fluid into chamber 9 to balance this pressure with that of chamber 4. By balancing the pressures in the two chambers, the force exerted by the pressure of chamber 4 on the sliding valve 34 is balanced with an equal pressure in chamber 9, thus enabling valve 34 to be easily moved out of the path of carriage 6.

Means are provided for moving the valve block 34 laterally and vertically to bring the same into line with and to seat the same against the seat 36 which means is preferably of the following construction:

Projected through the housing 1 into the chamber 35 are a pair of valve block actuating shafts 38. The shafts 38 are slidably mounted in stuffing boxes 39 and carry on their inner ends eccentric grooved rollers 40 which engage the block 34. The eccentric rollers 40 are grooved to receive the downward extension 41 of valve block 34.

Secured to the outer end of the rods 38 are flanged rollers 42 which are formed to receive the ends 43 of an actuating pitman 44. The pitman 44 is provided with an elongated slot 45 in which an actuating pin 46 moves. The pin 46 is secured to a disc 47, which disc 47 is provided with an actuating crank 48 journaled in a bearing 49 secured to the housing 1 and held in position by means of a collar 50.

The projecting end of the crank 48 is provided with a squared head 51 adapted to receive a wrench for rotation of the crank 48 to thereby rotate the disc 47 and through the pin 46 to actuate the pitman 44 to move the valve shafts 38 into and out from the housing 1 to shift the valve block 34 transversely of the path of movement of the carriage 6 when passing from the chamber 4 to the chamber 9. The ends 52 of the shafts 38 are squared to receive an actuating wrench so that the shafts 38 may be rotated to rotate eccentrics 40 and thereby move the valve block 34 upward into engagement with the seat 36.

Means are provided for removing the valve block 34 to repair or replace the same when desired without interrupting the flow of fluid through the housing 1, which means are preferably of the following construction:

Formed through the housing 1 at one end of the valve block 34 is a valve removal port 53 which is ordinarily threaded to receive a closure plug 54. In order to remove the valve block 34 a valve removal unit is provided which includes a nipple 55 which is threaded into the housing 1 around the plug 54 as indicated at 56. The nipple at its opposite end is threaded to a valve casting 57 in which a closure valve 58 is mounted. The opposite end of the valve casting 57 is threaded to an elongated nipple 59 which provides the valve block removal chamber 60.

At the end of the nipple 59 is threaded a cap 61 provided with a packing gland 62 through which a plug removing rod 63 passes. The plug removing rod 63 is provided with a square socket 64 within the nipple 59 adapted to pass over the square end 65 of the closure plug 54. The valve casting 57 is provided with an extension 66 into which the valve 58 is adapted to be moved by the rod 67 which passes through a valve cap 68. In removing the plug 54 the valve removing unit, including the nipple 55, is threaded to the housing 1 at the threads 56. The valve 58 is moved into the extension 66. The rod 63 is moved inwardly until the socket 64 fits over the squared end 65 of the plug 54. The rod 63 is then rotated to unthread the plug 54 from the housing 1, and when unthreaded are withdrawn rearwardly into the nipple 59.

The valve 58 is then moved into closed position to close the end of the nipple 55. The cap 61 is then unthreaded from the nipple 59, and the rods 63, cap 61 and plug 54 are withdrawn from the assembly.

A valve removing rod 69 carrying a cap 70 similar in all respects to the cap 61 is mounted in position in the nipple 59 by threading the cap 70 to the end of the nipple 59. The valve 58 is then opened and the threaded spear end 71 of the valve removing rod 69 is moved inwardly until the head 71 passes into the complementarily threaded end formed aperture 72 formed in the end of the valve block 34. The valve removing rod 69 is rotated to thread the head 71 into the valve block 34. The rod 69 is then pulled outwardly until the valve block 34 is in the nipple 59. The valve 58 is closed again and the cap 70 is unthreaded from the nipple 59 and the valve block 34 is either repaired, refinished or replaced as desired. In reassembling the valve block 34 within the housing 1 the reverse of the procedure above defined is followed.

Having fully described my invention, it is to be understood that I do not wish to be limited to the details herein set forth, but my invention is of the full scope of the appended claims.

I claim:

1. In an orifice meter plate housing, the combination of a housing providing an orifice plate chamber, a plate removing chamber, an orifice plate, means for moving the plate from one said chamber to the other including a plate carriage having spaced gear racks, gear means for engaging the said spaced gear racks mounted on spaced shafts projecting from the housing, closure means for closing communication between said chambers when the orifice plate carriage is moved into the plate removing chamber.

2. In an orifice meter plate housing, the combination of a housing providing an orifice plate chamber, a plate removing chamber, an orifice plate, means for moving the plate from one said chamber to the other including a plate carriage having spaced gear racks, gear means for engaging the said spaced gear racks mounted on shafts projecting from the housing, closure means for closing communication between the said chambers including a plate valve, a plate valve seat formed in the housing in the end of the plate removing chamber, means for shifting the plate valve transversely of the path of the movement of the orifice plate into position in alignment with the said plate valve seat, and means for moving the plate valve into engagement with the plate valve seat.

3. In an orifice meter plate housing, the combination of a housing providing an orifice plate chamber, a plate removing chamber, an orifice plate means for moving the plate from one said chamber to the other including a plate carriage having spaced gear racks, gear means for engaging the said spaced gear racks mounted on shafts projecting from the housing, closure means for closing communication between the said chambers including a plate valve, a plate valve seat formed in the housing on the end of the plate removing chamber, means for shifting the plate valve transversely of the path of movement of the orifice plate into position in alignment with the said plate valve seat, and for moving the plate valve into engagement with the plate valve seat, and means for removing the closure means from the housing without interrupting the flow of fluid through the housing.

4. In an orifice meter plate housing, the combination of a housing providing an orifice plate chamber, a plate removing chamber, an orifice plate, means for moving the plate from one said chamber to the other including a plate carriage having spaced gear racks, gear means for engaging the said spaced gear racks mounted on shafts projecting from the housing, closure means for closing communication between the said chambers including a plate valve, a plate valve seat formed in the housing in the end of the plate removing chamber, means for shifting the plate valve transversely of the path of movement of the orifice plate into position in alignment with the said plate valve seat, means for moving the plate valve into engagement with the plate valve seat, means for removing the closure means from the housing without interrupting the flow of fluid through the housing, the latter said means including a closure means removing housing, and valve means between the main housing and the closure means removing housing.

5. An orifice meter housing, having an orifice plate chamber and an orifice plate removing chamber, a valve member operatively mounted between said chambers for opening and closing the passage therebetween, said orifice housing having a threaded opening adjacent said valve member, a closure threaded into said opening, a plug chamber encircling said closure, a valve means for closing the end of said plug chamber, a valve removing chamber mounted upon said valve means, said valve removing chamber having a threaded end adapted to receive a closure plug, and also adapted to receive a plug carrying means for removing the first mentioned plug or a third plug carrying means adapted to retract the valve into said chamber.

6. In an orifice meter plate housing, the combination of a housing providing an orifice plate chamber, a plate removing chamber, an orifice plate, means for moving the plate from one said chamber to the other including a plate carriage having spaced gear racks, gear means for engaging the said spaced gear racks mounted on shafts projecting from the housing, closure means for closing communication between the said chambers including a plate valve, a plate valve seat formed in the housing in the end of the plate removing chamber, means for shifting the plate valve transversely of the path of the movement of the orifice plate into position in alignment with the said plate valve seat, and means for maintaining the plate valve in sealing engagement with the plate valve seat.

7. An orifice meter plate carrier for an orifice meter including an orifice meter housing having a fluid passage therethrough, an orifice plate carrier slidably mounted therein, an orifice plate mounted on one face of said carrier, said carrier having an annular groove formed in the other face thereof, an annular ring slidably mounted in said annular groove, and spring means for yieldingly urging the annular ring on said carrier apart to yieldingly urge the orifice plate into sealing engagement with said housing.

8. An orifice meter plate carrier for an orifice meter including an orifice meter housing having a fluid passage therethrough, an orifice plate carrier slidably mounted therein, an orifice plate mounted on one face of said carrier, said carrier having an annular groove formed in the other face thereof and encircling said fluid passage, an annular ring slidably mounted in said annular groove, spring means for yieldingly urging the annular ring and said carrier apart to yieldingly urge said orifice plate into sealing engagement with said housing, and means for limiting the relative movement between said ring and carrier.

9. In an orifice meter including an orifice meter housing having a fluid passage therethrough and a slideway transverse thereof, an orifice plate carrier slidably mounted in said housing slideway, an orifice plate mounted on one face of said carrier, said carrier having an annular groove formed in the other face thereof, an annular ring slidably mounted in said annular groove, and spring means for yieldingly urging the annular ring and said carrier apart to yieldingly urge said orifice plate into sealing engagement with one face of said housing slideway and said annular ring toward the opposite face of said slideway.

10. In an orifice meter including an orifice meter housing having a fluid passage therethrough and a slideway transverse thereof, an orifice plate carrier slidably mounted in said housing slideway, an orifice plate mounted on one face of said carrier, said carrier having an annular groove formed in the other face thereof, an annular ring slidably mounted in said annular groove, spring means for yieldingly urging the annular ring and said carrier apart to yieldingly urge said orifice plate into sealing engagement with one face of said housing slideway and said annular ring toward the opposite face of said slideway, and means for limiting the relative movement between said ring and carrier.

11. A removable closure for the orifice plate removing chamber of an orifice meter, including an orifice meter housing having a plate removing chamber with a rectangular opening providing a seat, and having longitudinally grooved side walls extending above said seat, a removable sealing block positioned upon said seat, and a locking bar arranged for endwise insertion and removal into and out of said grooves, and means threaded through said bar and bearing upon the sealing block for clamping said block upon its seat to form a fluid tight closure.

PAUL P. DANIEL.